United States Patent
Braatz et al.

[11] Patent Number: 5,775,583
[45] Date of Patent: Jul. 7, 1998

[54] HYDRODYNAMIC HEAT GENERATOR FOR A MOTOR VEHICLE

[75] Inventors: Andreas Braatz, Rutesheim; Hans Hanke, Heuchlingen, both of Germany

[73] Assignee: Mercedes-Benz AG, Stuttgart, Germany

[21] Appl. No.: 429,647

[22] Filed: Apr. 27, 1995

[30] Foreign Application Priority Data

Apr. 29, 1994 [DE] Germany .................. 44 15 031.8

[51] Int. Cl.[6] .................. B60H 1/00; B60H 1/03; F01P 5/12
[52] U.S. Cl. .................. 237/12.3 B; 126/247; 123/41.44
[58] Field of Search .................. 237/12.3 R, 12.3 B; 126/247, 248, 249, 254; 123/41.44, 41.46

[56] References Cited

U.S. PATENT DOCUMENTS

| | | | |
|---|---|---|---|
| 2,291,124 | 7/1942 | Wallace | 126/247 |
| 2,506,547 | 5/1950 | Findley | 123/41.44 |
| 3,720,372 | 3/1973 | Jacobs | 123/41.44 |
| 4,427,150 | 1/1984 | Basshuysen et al. . | |
| 4,493,293 | 1/1985 | Paul et al. | 123/41.46 |
| 4,733,635 | 3/1988 | Menard et al. | 237/12.3 R |
| 5,431,340 | 7/1995 | Schirpke et al. | 237/12.3 B |
| 5,573,184 | 11/1996 | Martin | 237/12.3 R |

FOREIGN PATENT DOCUMENTS

| | | |
|---|---|---|
| 31 47 468 | 12/1982 | Germany . |
| 3147468 | 12/1982 | Germany . |
| 32 41 835 | 2/1984 | Germany . |
| 3241835 | 2/1984 | Germany . |

*Primary Examiner*—William Doerrler
*Attorney, Agent, or Firm*—Klaus J. Bach

[57] ABSTRACT

In a hydrodynamic heat generator for a motor vehicle with an internal combustion engine having a cooling water circuit with a circulating pump, the hydrodynamic heat generator comprises a generator housing part which is integrated with a pump housing part and defines a water space which is in communication with the pumping space and includes a bladed rotor and a bladed stator firmly supported in the generator housing part adjacent the water space and an electromagnetic clutch for engagement of the bladed rotor with a drive shaft which extends through the heat generator housing part into the pump housing part and carries, at its end in the pump housing part, an impeller for circulating the cooling water.

5 Claims, 1 Drawing Sheet

HYDRODYNAMIC HEAT GENERATOR FOR A MOTOR VEHICLE

BACKGROUND OF THE INVENTION

The invention relates to a hydrodynamic heat generator arranged in the cooling circuit of a motor vehicle internal combustion engine for supplying additional heat to the cooling water when the waste heat provided by the engine is insufficient to heat the vehicle.

DE 31 47 468 A1 discloses such a hydrodynamic heat generator in the cooling water circuit of an internal combustion engine for a motor vehicle, which is designed as a fluid brake operated by the internal-combustion engine via an electromagnetic clutch. The fluid brake and the electromagnetic clutch are designed as separate components and are mounted as such on the internal combustion engine.

Furthermore, DE 32 41 835 C1 likewise discloses a heat generator which is designed as a fluid brake and which, via an electromagnetic clutch constructed separately from the latter, is driven by the internal combustion engine. The fluid brake can be used either for heating the cooling water or as a hydrodynamic clutch for the water pump.

It is the object of the invention to provide a hydrodynamic heat generator which is simple and compact and which can be produced cost-effectively and incorporated into the engine cooling system without the need for additional drive components.

SUMMARY OF THE INVENTION

In a hydrodynamic heat generator for a motor vehicle with an internal combustion engine having a cooling water circuit with a circulating pump, the hydrodynamic heat generator comprises a generator housing part which is integrated with a pump housing part and defines a water space which is in communication with the pumping space and includes a bladed rotor and a stator and an electromagnetic clutch for engagement of the bladed rotor with a drive shaft which extends through the heat generator housing part into the pump housing part and carries, at its end in the pump housing part, an impeller for circulating the cooling water.

With the arrangement according to the invention the hydrodynamic heat generator including the electromagnetic clutch is integrated into the water space of the housing of the fluid brake and, as a result of simple mounting and sealing arrangements, the fluid brake can also be produced as a compact, low-cost subassembly.

Since further the hydrodynamic fluid brake is combined with the housing of the water pump of the coolant circuit of the internal combustion engine, the two blade structures (rotor and stator) of the fluid brake, together with all the necessary control and bearing elements and water-carrying conduits, can be accommodated in a common housing with the water pump. Also, as a consequence, particularly in comparison with individual units, there is no need for further components, such as independent mounts for the unit on the engine block, hoses, seals, bearings, housing parts and gaskets.

A further constructional simplification of the hydrodynamic heat generator can be achieved if the armature disc of the electromagnetic clutch and the bladed rotor of the heat generator are constructed as a one-piece design comprising the armature disc and rotor blade wheel. However, the invention and its advantages will become more readily apparent from the following description of a preferred embodiment thereof as represented in the accompanying drawings.

DESCRIPTION OF PREFERRED EMBODIMENT

Figure 1:
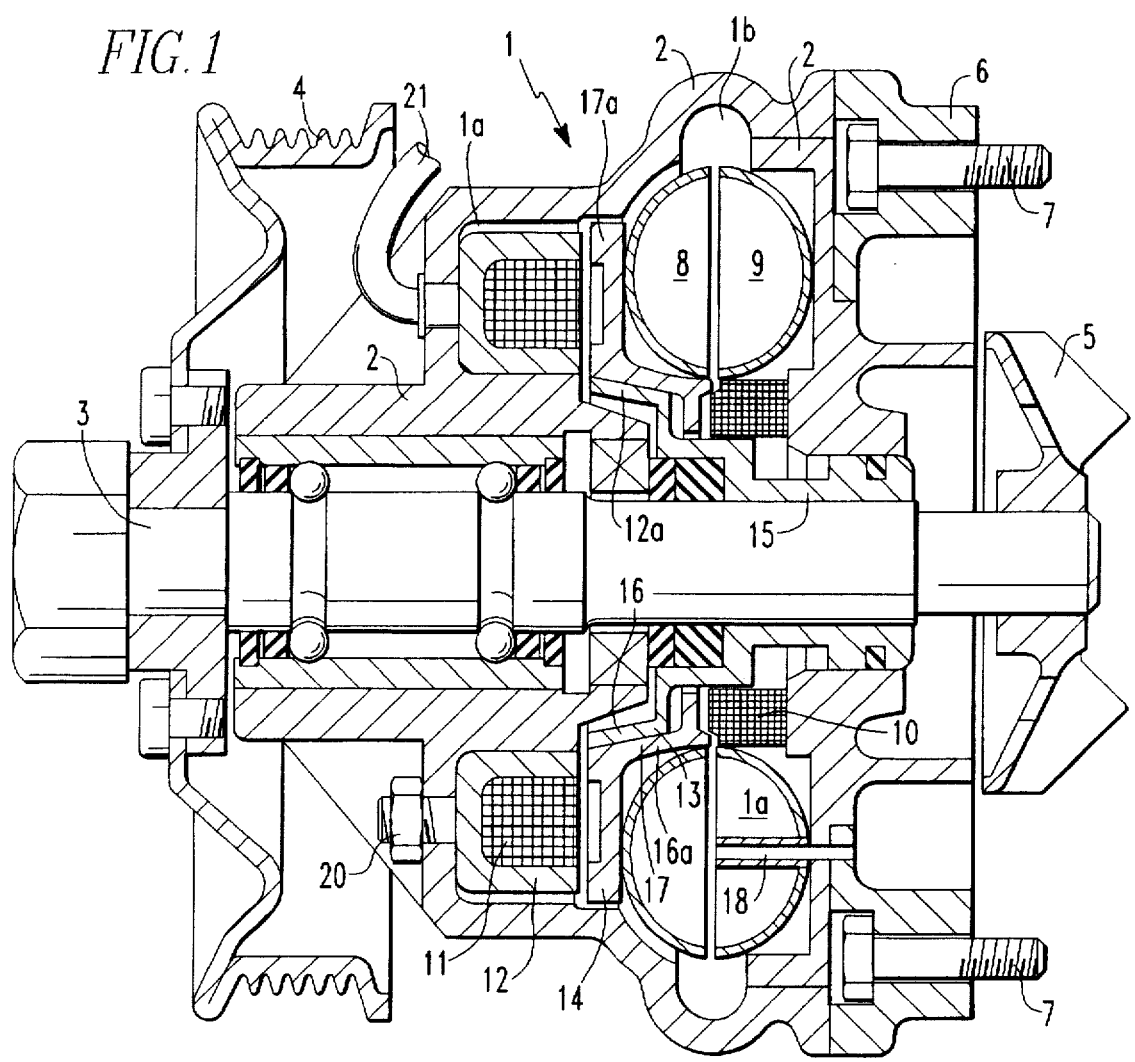
FIG. 1 shows a hydrodynamic heat generator according to the invention with an integrated electromagnetic clutch, a housing, a bladed rotor and stator, the hydrodynamic generator being integrated with the housing of a water pump.

FIG. 1 shows, combined in a complete subassembly, a hydrodynamic heat generator 1 according to the invention with a housing 2, in which is mounted a drive shaft 3, to which a belt pulley 4 for driving the latter and an impeller 5 of a water pump are fixedly connected. The hydrodynamic heat generator 1 is used as a heating device for a motor vehicle and is included in a cooling-water circuit, not shown in detail, of an internal combustion engine.

The housing 2 of the hydrodynamic heat generator 1 which is designed as a fluid brake, is integrated with a pump housing of the water pump arranged in the cooling-water circuit, only a pump housing part 6 of the water pump being shown in the drawing. The rest, not shown, of the pump housing together with the inlet and collecting channel for the water pump is cast on one end face, not shown, of the crankcase of the internal combustion engine, in such a way that the complete subassembly can be mounted sealingly to the crankcase by means of bolts 7 and the impeller 5 can thus be inserted into the pump housing part located on the crankcase side.

The hydrodynamic heat generator 1 comprises the housing 2 together with water space 1a, a bladed rotor 8 and a bladed stator 9. An electromagnetic clutch 12 with a first magnet 10 and with a second magnet 11 is operatively connected to two clutch halves 13 and 14 of a cone clutch structure 12a, the electromagnetic clutch 12 and the contact faces of the cone clutch structure 12a being arranged in the water space 1a of the housing 2 of the hydrodynamic heat generator 1.

The first magnet 10 is fastened by means of screws 19 (see FIG. 2) and the second magnet is fastened by means of screws 20 to the housing 2.

The clutch half 13 comprises a sleeve 15 which is fixedly connected to the drive shaft 3 and includes a male tapered ring structure 16, and the clutch half 14 comprises a carrier 17 of the bladed rotor 8, which includes a female tapered ring 16a that forms the counterpiece of the male tapered ring structure 16. The carrier 17 at the same time forms an armature disc 17a of the clutch 12, the armature disc 17a being integrated in the bladed rotor 8. The armature disc 17a and the bladed rotor 8 are preferably designed as one component.

The carrier 17 together with the bladed rotor 8 is axially displaceable relative to the drive shaft 3 and the female tapered ring 16a.

A water inlet passage 18 supplies water from the delivery side of the water pump through the pump housing part 6 into the water space 1a and then to the annular channel 1b, from which a cooling water passage, not shown, extends to the cooling water circuit for the return of the cooling water to the cooling circuit.

The carrier 17 with the armature disc 17a and the bladed rotor 8 is axially moveable between a first position in which it is held by a magnet 10 and a second position in which it is engaged by the cone clutch 12a for rotation with the input shaft 3. When no additional heating capacity is required, the first magnet 10, which is preferably designed as a permanent magnet, holds the rotor blade wheel 8 in a position, in which the clutch halves 13 and 14 of the cone clutch 12a are disengaged from one another. The sleeve 15 together with taper ring 16 rotates together with the drive shaft 3, but the bladed rotor 8 is axially displaced and is retained in its first position by the magnet 10 so that the bladed rotor 8 is not driven and no power is consumed thereby.

If additional heating capacity is desired, the second magnet 11 which is an electromagnet, is energized via current-supply leads 21, its magnetic field being stronger than the magnetic field of the first magnet 10 and being polarized in such a way that the bladed rotor 8 can easily be drawn out of the first position into the second position. In the second position, the clutch halves 13 and 14 of the cone clutch 12a are firmly engaged with one another, with the result that the bladed rotor 8 is operatively connected to the drive shaft 3 and is driven thereby. In this position, heat is generated in the cooling water which is accelerated by the bladed rotor 8 and is decelerated again in the bladed stator 9, whereby the kinetic energy supplied to the cooling water is efficiently converted into heat.

Figure 2:
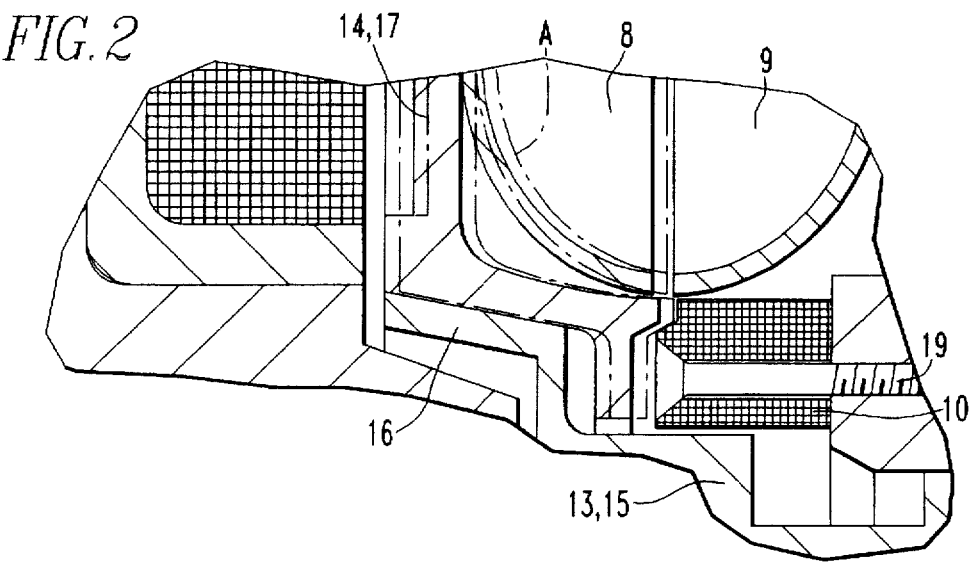
FIG. 2 shows an enlarged section of FIG. 1 to explain the operative interconnection between the bladed rotor and the electromagnetic clutch.

FIG. 2 is an enlarged view of a section of the cone clutch 12a in the engaged position of its clutch halves 13 and 14. In this position, the second magnet 11 of the electromagnetic clutch 12 is activated and draws the bladed metal rotor 8 or its carrier 17 into the second position and thus leads, via the cone clutch 12a, to the engagement between the bladed rotor 8 and drive shaft 3. When the second magnet 11 is deenergized, the magnetic field of the first magnet 10 causes the bladed rotor 8 or its carrier 17 to move to the first position which is indicated by the dotted line A. The drive shaft 3 and bladed rotor 8 are then disengaged, and the sleeve 15 together with tapered ring 16 rotates freely with the drive shaft 3.

The heat generator according to the invention is used particularly in vehicles with highly efficient engines, since, as a result of their low power losses, they often do not generate sufficient waste heat so that additional heat has to be provided at times for reasons of passenger comfort.

What is claimed is:

1. A hydrodynamic heat generator for a motor vehicle with an internal combustion engine having a cooling water circuit with a water circulating pump having a pump drive shaft driven by said internal combustion engine and including a pump housing part to be mounted on said engine, said hydrodynamic heat generator comprising a generator housing part integrated with said pump housing part and defining a generator water space, said housing parts including passages providing for communication between said pump and said generator water space, a pump impeller mounted on said drive shaft in said pump housing part, a bladed stator firmly supported in said generator water space, a bladed rotor rotatably supported in said water space adjacent said stator, and an electromagnetic clutch also arranged in said generator water space for engagement of said bladed rotor for rotation with said drive shaft when the cooling water temperature is insufficient.

2. A heat generator according to claim 1, wherein said electromagnetic clutch includes an armature disc formed as an integral part of said bladed rotor.

3. A heat generator according to claim 1, wherein a magnetic structure is disposed in said water space adjacent said bladed rotor for holding said bladed rotor disengaged from said drive shaft, said electromagnetic clutch being sufficiently strong to overcome the holding force of said magnetic structure when said electromagnetic clutch is energized.

4. A heat generator according to claim 3, wherein said magnetic structure for holding said bladed rotor disengaged from said drive shaft is a permanent magnet.

5. A heat generator according to claim 2, wherein said electromagnetic clutch includes an armature disc and said bladed rotor is disposed on said drive shaft so as to be axially movable thereon together with said armature disc.

* * * * *